W. C. McDOWELL & E. C. EWELL.
Fruit-Drier.
No. 215,952. Patented May 27, 1879.
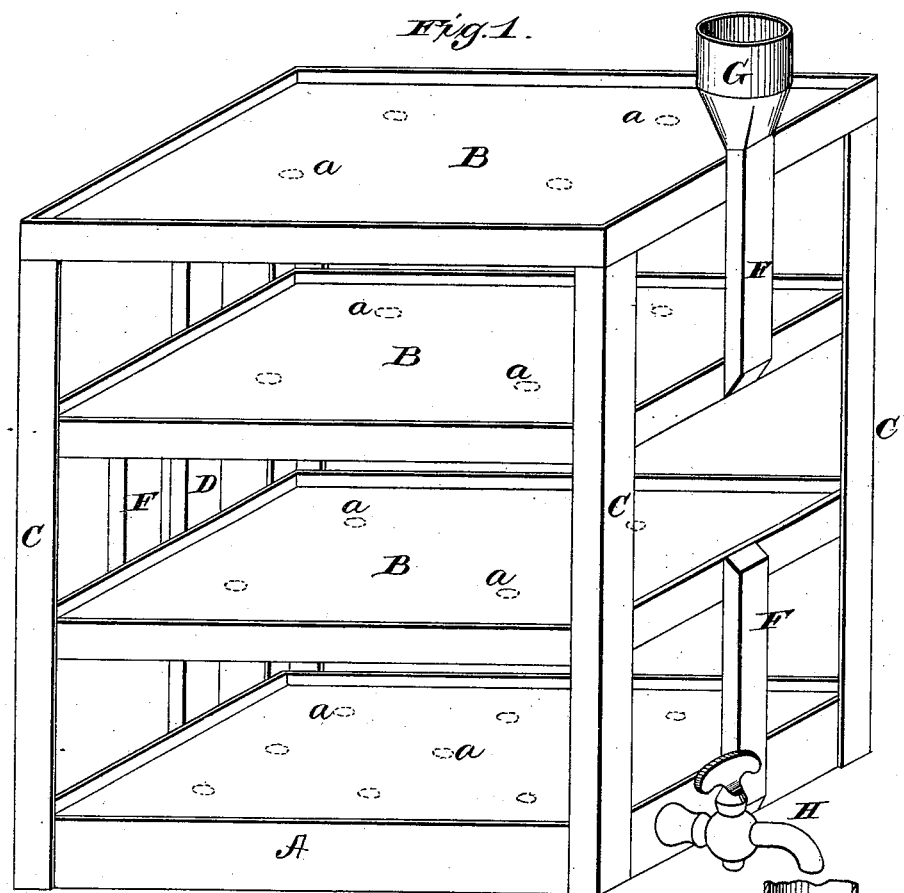
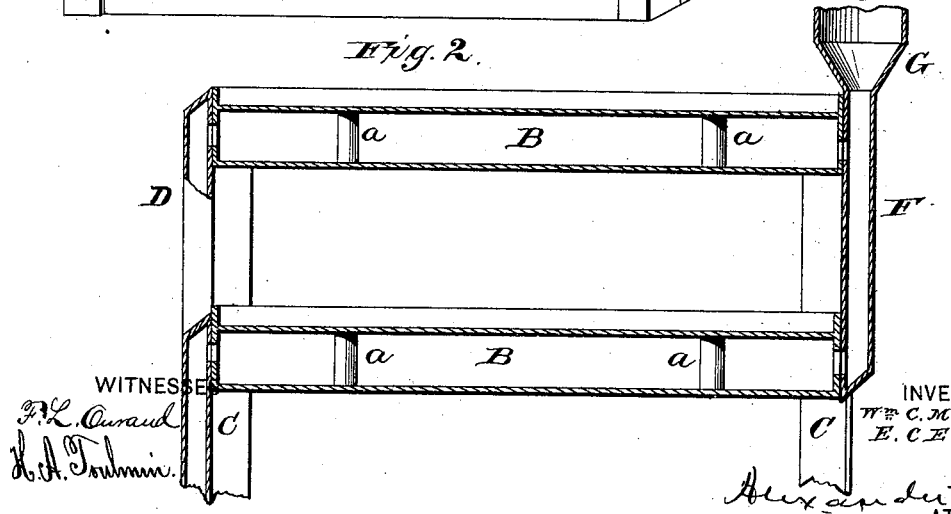

UNITED STATES PATENT OFFICE.

WILLIAM C. McDOWELL AND EDMUND C. EWELL, OF ROMEO, MICHIGAN.

IMPROVEMENT IN FRUIT-DRIERS.

Specification forming part of Letters Patent No. 215,952, dated May 27, 1879; application filed April 2, 1879.

*To all whom it may concern:*

Be it known that we, WILLIAM C. MCDOWELL and EDMUND C. EWELL, of Romeo, in the county of Macomb, and in the State of Michigan, have invented certain new and useful Improvements in Fruit-Driers; and do hereby declare that the following is a full, clear, and exact description thereof, reference being had to the accompanying drawings, and to the letters of reference marked thereon, making a part of this specification.

The nature of our invention consists in the construction and arrangement of a fruit-drier, as will be hereinafter more fully set forth.

In order to enable others skilled in the art to which our invention appertains to make and use the same, we will now proceed to describe its construction and operation, referring to the annexed drawings, in which—

Figure 1 is a perspective view of our improved fruit-drier. Fig. 2 is a longitudinal section of a part of the same.

A represents the heater, constructed of any suitable form and size to be placed on a stove or furnace, or have a suitable furnace connected to it in any convenient manner.

Above the heater A is a series of hollow pans, B B, elevated one above the other, and connected and held in place by corner-strips C, or in any other suitable or convenient manner.

The heater A and pans B are all constructed to form trays on top for receiving the fruit or other articles to be dried.

The upper part of the heater A is, by a pipe, D, connected with the top pan, and the various pans are connected alternately at opposite ends by pipes F, the bottom pan connecting with the lower part of the heater, as shown.

The pans and heater are to be filled with water, and as the water in the heater becomes hot it rises to the top pan, displacing the cold water therein, which passes down to the bottom, and thus a continuous circulation of hot water is caused through the pans.

For the purpose of receiving the expansion of the water, we provide a stand-pipe, G, which may form part of the top pipe, F, or be otherwise arranged in any suitable manner.

The pans and heater are provided with stay-bolts *a a* to prevent bulging, and the heater is further provided with a faucet, H, for drawing off the water.

The heater A is actually a pan, as well as the pans B, but is made higher for containing a sufficient quantity of water.

Having thus fully described our invention, what we claim as new, and desire to secure by Letters Patent, is—

1. The combination of the heater A, the series of pans B, and circulating-pipes D F, whereby a continuous circulation of hot water is obtained through the pans, substantially as and for the purposes herein set forth.

2. The combination of the heater A, the series of hollow pans B, circulating-pipes D F, and stand-pipe G, all substantially as and for the purposes herein set forth.

In testimony that we claim the foregoing we have hereunto set our hands this 15th day of March, 1879.

WILLIAM C. McDOWELL.
EDMUND C. EWELL.

Witnesses:
FRANK N. WHITE,
D. N. LOWELL.